(12) United States Patent
Lee et al.

(10) Patent No.: US 7,412,269 B2
(45) Date of Patent: Aug. 12, 2008

(54) PORTABLE ELECTRONIC DEVICE

(75) Inventors: Kap Soung Lee, Pulau Pinang (MY); Ying Cheh Tan, Pulau Pinang (MY)

(73) Assignee: Sony EMCS (Malaysia) SDN. BHD., Kuala Lumpur (MY)

( * ) Notice: Subject to any disclaimer, the term of this patent is extended or adjusted under 35 U.S.C. 154(b) by 438 days.

(21) Appl. No.: 11/118,545

(22) Filed: Apr. 29, 2005

(65) Prior Publication Data

US 2005/0250455 A1    Nov. 10, 2005

(51) Int. Cl.
*H04M 1/00* (2006.01)

(52) U.S. Cl. .................... 455/575.1; 455/128; 455/194; 455/3.06; 364/708.1

(58) Field of Classification Search .............. 455/575.1, 455/128, 194.1, 3.06; 364/708.1, 709.12
See application file for complete search history.

(56) References Cited

U.S. PATENT DOCUMENTS

| | | | | |
|---|---|---|---|---|
| 4,111,444 A | * | 9/1978 | Clements, Jr. ............... 280/816 |
| 5,096,195 A | * | 3/1992 | Gimmon ....................... 463/20 |
| 5,365,502 A | * | 11/1994 | Misono ........................ 369/18 |
| 5,825,675 A | * | 10/1998 | Want et al. ................... 708/142 |
| 6,323,753 B2 | * | 11/2001 | Begum ....................... 340/5.91 |
| 6,393,499 B1 | * | 5/2002 | Chaiken et al. ............... 710/19 |
| 6,885,532 B2 | * | 4/2005 | Noro .......................... 361/93.1 |
| 2005/0054392 A1 | * | 3/2005 | Too et al. .................. 455/575.1 |
| 2005/0259071 A1 | * | 11/2005 | Pearlson ..................... 345/156 |
| 2006/0146770 A1 | * | 7/2006 | Geva et la. ................... 370/338 |
| 2006/0226322 A1 | * | 10/2006 | Spellman .................... 248/306 |

FOREIGN PATENT DOCUMENTS

JP            11152144 A    *    6/1999

* cited by examiner

*Primary Examiner*—Matthew Anderson
*Assistant Examiner*—Minh Dao
(74) *Attorney, Agent, or Firm*—Frommer Lawrence & Haug LLP; William S. Frommer; Thomas F. Presson

(57) ABSTRACT

A portable electronic device provided with interface means which include an LCD and function keys (7, 8). The device is provided with a left-hand mode and a right-hand mode to facilitate operation of the interface whether the device is held in the right hand or the left hand. A control means is provided for selectively transferring from one mode to the other mode.

1 Claim, 6 Drawing Sheets

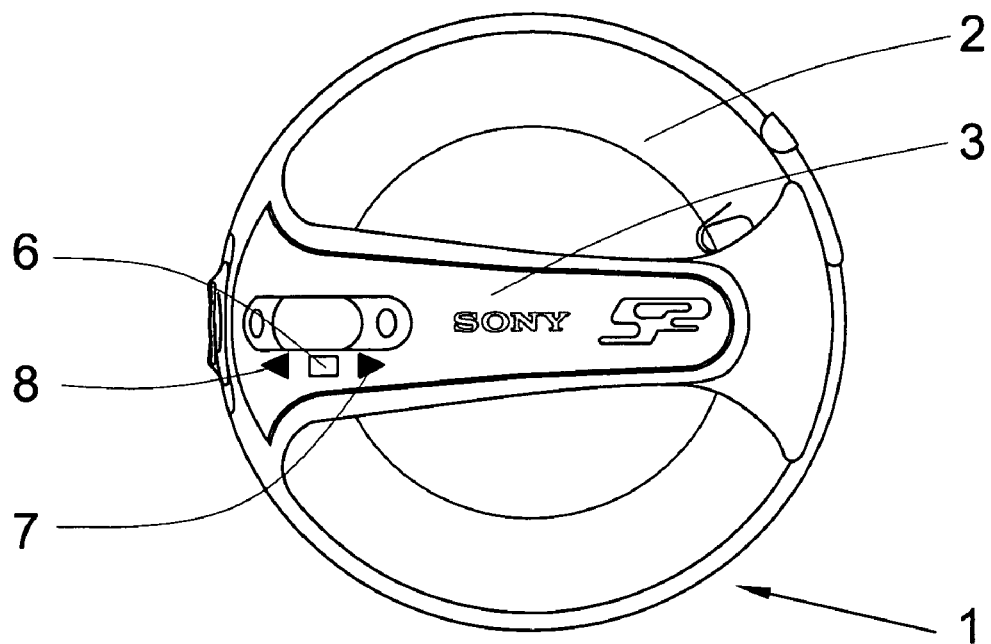
Fig. 1
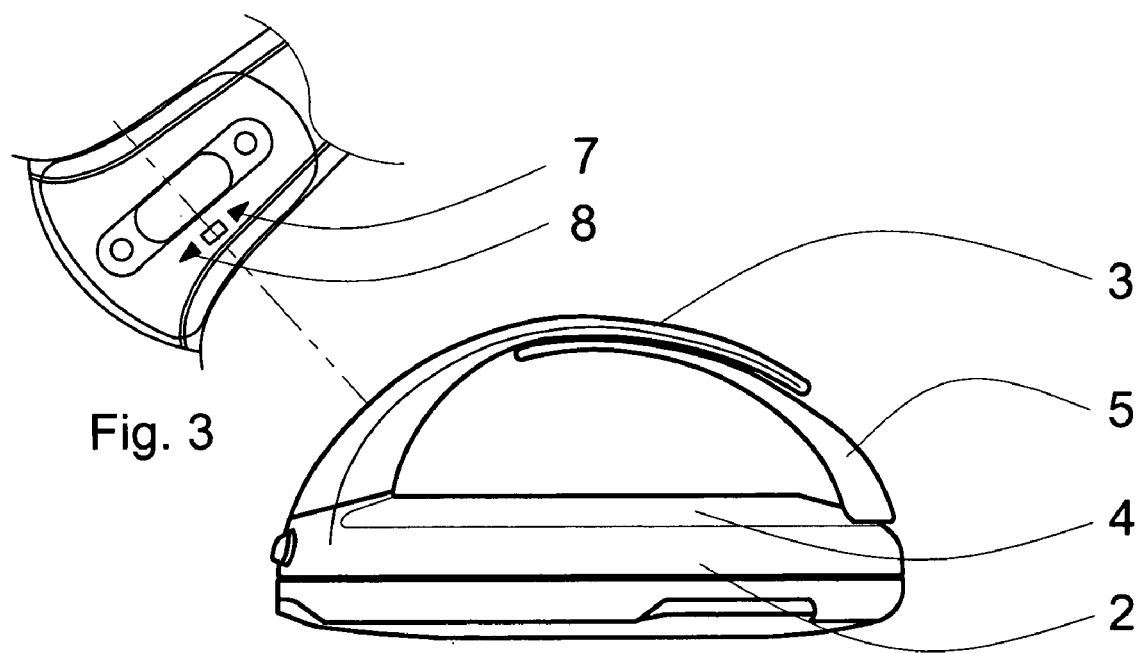
Fig. 3
Fig. 2

KEY 1    KEY 2

FLOW CHART 1: MENU FUNCTION AND FIRMWARE SETTING:

FLOW CHART 2: WHEN RADIO IS ON:

PORTABLE ELECTRONIC DEVICE

TECHNICAL FIELD

The present invention relates to portable electronic devices which incorporate an interface for operating the device and/or for viewing information on the interface.

BACKGROUND OF THE INVENTION

There are a wide range of portable electronic devices on the market. For example, handheld computers, radios, and compact disc players. The devices normally include an interface incorporating an information display panel and function keys for operating the device. For example, a portable radio may include an interface comprising a display panel which shows the frequency of the current radio station being played, and function keys for the purpose of increasing or decreasing the frequency when the user wishes to search for an alternative radio station.

Most of the interfaces of these prior art portable electronic devices are designed for the right-handed person. When a left-handed person holds some of these prior art devices in the left hand it can be difficult to see the display panel or difficult to operate the function keys.

Therefore, it is an object of this invention to provide a portable electronic device which is a useful alternative to known portable electronic devices and/or which is more user friendly to the left handed person.

DISCLOSURE OF INVENTION

In one aspect, the invention provides a portable electronic device comprising a user-interface characterized in that the user-interface has user-selectable configurations respectively optimized for viewing or operation of the user-interface from different directions relative to the device.

In accordance with another aspect of the invention, there is provided a portable electronic device including left-hand mode means and right-hand mode means to facilitate reading and/or operation of interface means, whether the device is held in the right hand or the left hand, and control means for selectively transferring from one mode to the other mode.

The control means is operated, to select the desired mode, through the interface means. When transferring from one mode to the other mode, display information on the interface means may be re-positioned to align with the general direction of viewing of the operator, so as to be easily read.

The interface means facilitates operation of the device and may include function keys. When selectively transferring from one mode to the other mode the function of at least two of the function keys may be exchanged. Preferably, the exchangeable function keys include two arrow keys pointing in opposite directions.

In a preferred arrangement, the electronic device is provided with a handle or hand strap means and the interface means is located on the handle means.

Preferably, the portable electronic device includes a disc player, such as a compact disc player.

In accordance with a further aspect of the invention there is provided a portable electronic device including:

a generally disc-shaped disc player having generally centrally located hand strap means spaced above an upper surface of the disc shaped player whereby in use the hand normally passes under the hand strap and grips the periphery of the player, an information display panel and function keys located on the hand strap, the function keys including two arrow keys pointing in opposite directions, left-hand mode means and right-hand mode means to facilitate viewing the display and operation of the function keys whether the device is held in the right hand or the left hand, and control means for transferring from one mode to the other mode, wherein when transferring from one mode to the other mode the display information is inverted and the two arrow function keys exchange functions.

BRIEF DESCRIPTION OF DRAWINGS

FIG. 1 is a plan view of an example of a compact disc player constructed in accordance with this invention, FIG. 2 is a side view of the compact disc player of FIG. 1, FIG. 3 is a an enlarged part view of the hand strap of the compact disc player of FIG. 1 showing the LCD display and the function keys.

DESCRIPTION OF A PREFERRED EXAMPLE

Figure 4:
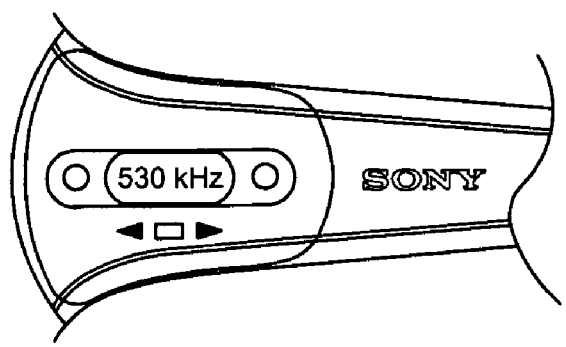
FIG. 4 is a part view of a hand strap constructed in accordance with this invention showing the LCD display and the function buttons when the compact disc player is held in the right hand.

An example of the invention in the form of a compact disc (CD) player (1) is illustrated in FIGS. 1 to 3. The CD player also incorporates a radio receiver, and is provided with a disc-shaped body portion (2). The body portion is provided with a centrally located handle portion (3) on its upper surface (4). The hand strap (3) is upwardly arcuate in form and extends the width of the CD player body (2). This arrangement results in a space between the upper surface (4) of the body and the under surface (5) of the handle, the space being adapted to receive the hand of the user, when in use.

The CD player is provided with interface means which includes an LCD display and arrow function keys. The LCD display is provided on the upper surface (6) and at one end of the hand strap (3), and a pair of arrow function keys (7, 8) pointing in opposite directions, are located below the LCD. Any desired information could be provided on the LCD display such as the frequency of the current radio station being played. Arrow function key (7) is used for the "forward function" or increase frequency function whereas arrow key (8) is used for the "back" function or the decrease frequency function. Alternatively, the function keys (7, 8) are used to step up and down through a series of preset channels.

Figure 5:
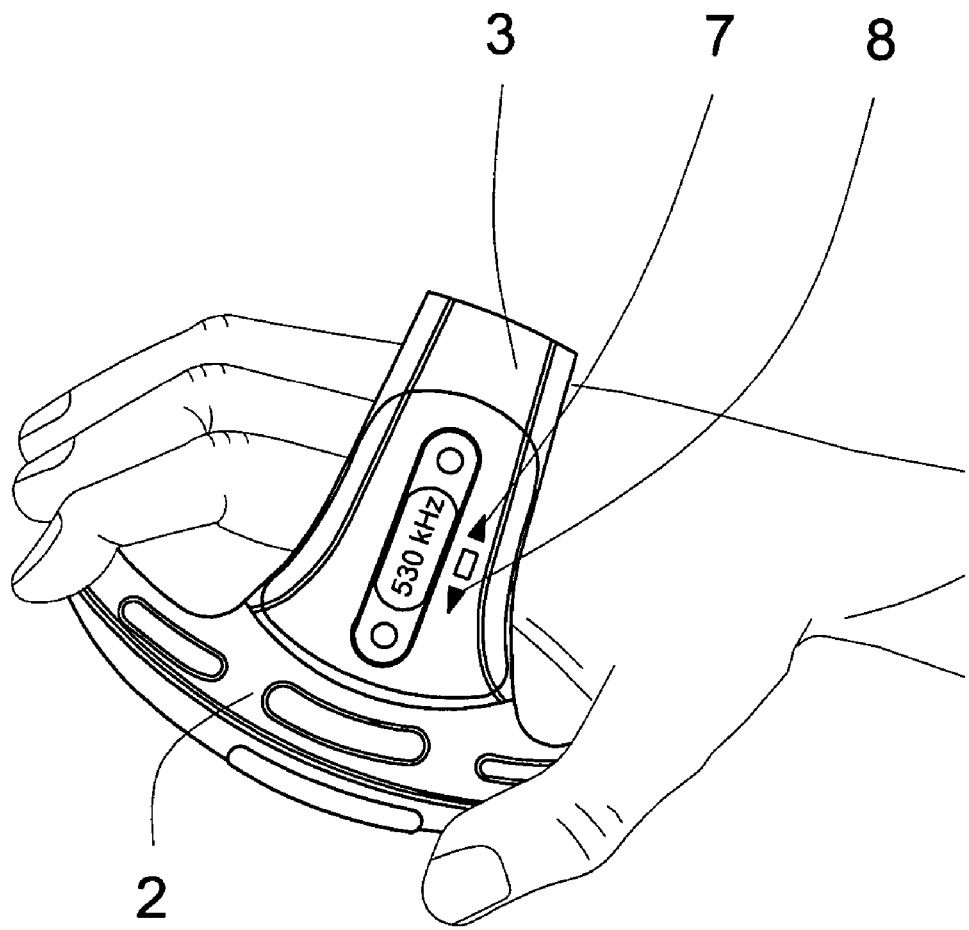
FIG. 5 is a part view showing the position of the right hand under the hand strap of the compact disc player of FIG. 4.
Figure 6:
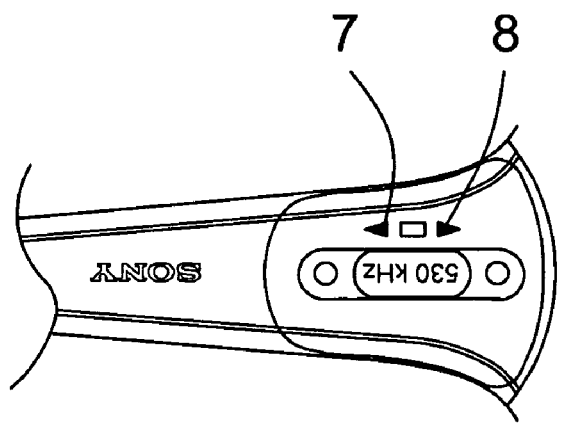
FIG. 6 is a part view of a hand strap of a device useful for understanding of the invention and showing the view of the LCD display and the function buttons when held in the left hand.

As seen in FIG. 5 the CD player is held in the right hand by passing the hand through the space between the hand strap (3) and the CD player body (2) and by gripping the peripheral edge of the disc shaped body. The user's thumb is on the LCD display side of the strap. As seen in FIG. 4 the LCD display is easy to see and read, the numerals being upright, and the arrow keys point in the conventional direction (right for up or forward, and left for down or backward). Arrow key (7) is used to increase radio frequency whereas arrow key (8) is used to decrease the radio frequency. The thumb of the right hand is free to operate other function keys located on the peripheral edges of the CD player body (2).

Figure 7:
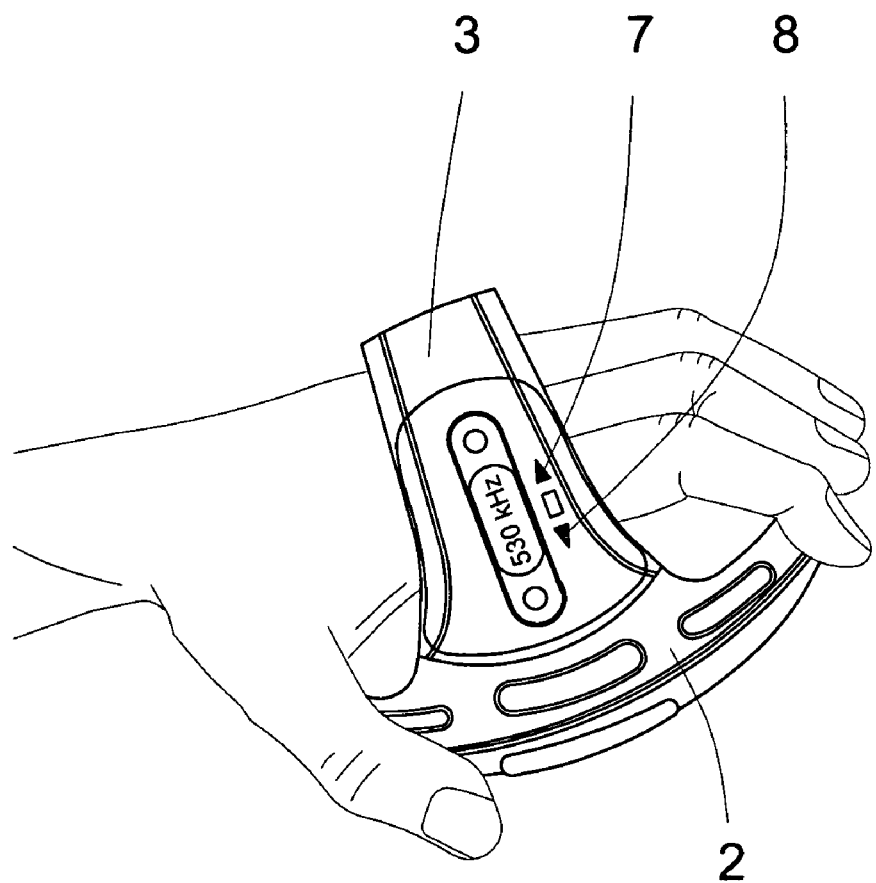
FIG. 7 is a part view showing the position of the left hand under the hand strap of the compact disc player of FIG. 6.

As seen in FIG. 7, a CD player that is useful for understanding the invention is held in the left hand by passing the hand through the space between the hand strap (3) and the CD player body (2) and by gripping the peripheral edge of the disc shaped body. The left hand is passed under the hand strap in the opposite direction to that of the right hand in order to leave the left hand thumb free to perform other functions. However, as viewed by the left-handed user, the LCD is now difficult to read. In fact, the display information letters on the LCD appear upside down or inverted because the left-handed viewer views the display from the opposite direction to that of the right-handed viewer. Furthermore, arrow key (7) which is for increasing the frequency is on the left (which conventionally means down or backward), and arrow key (8) which is used for decreasing the frequency is now on the right of the viewer (which conventionally means up or forward).

Figure 8:
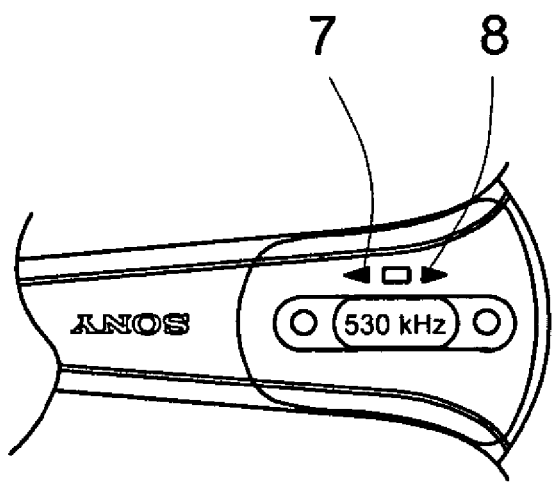
FIG. 8 is a part view a handle constructed in accordance with this invention showing the view of the function buttons and the LCD when a compact disc player constructed according to the present invention is held in the left hand.
Figure 9:
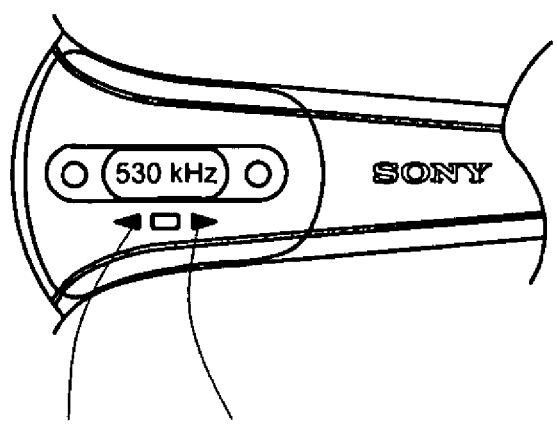
FIG. 9 is a view of the LCD and arrow buttons to facilitate an understanding of the software flowcharts shown in FIGS. 10 to 12, and FIGS. 10 to 12 are software flowcharts.
Figure 10:
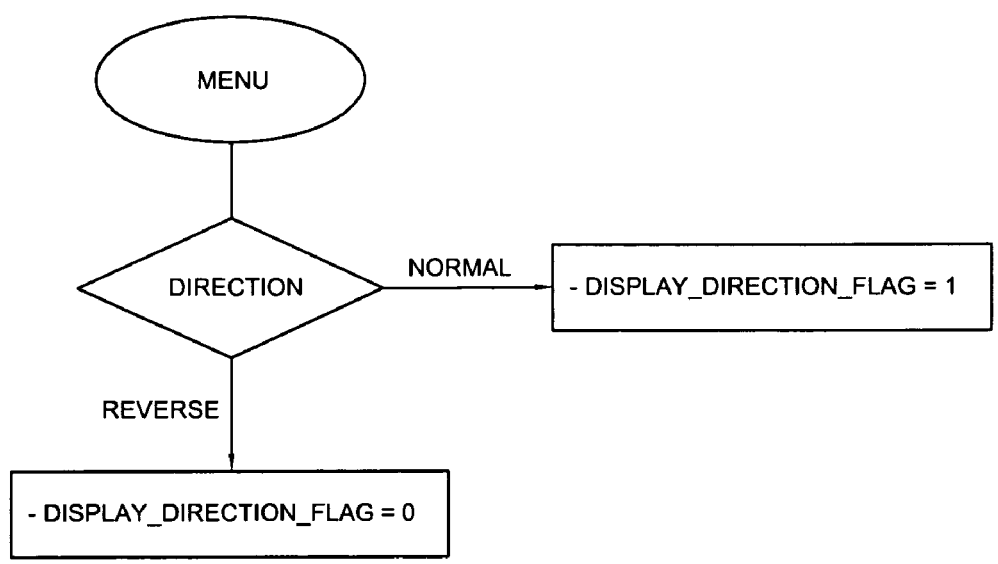
Figure 11:
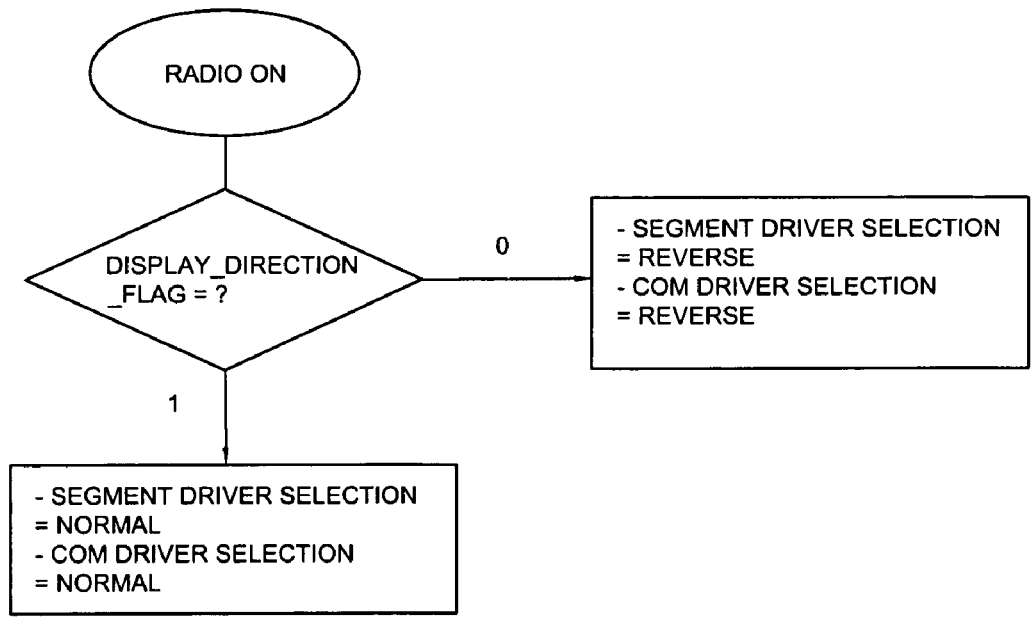
Figure 12:
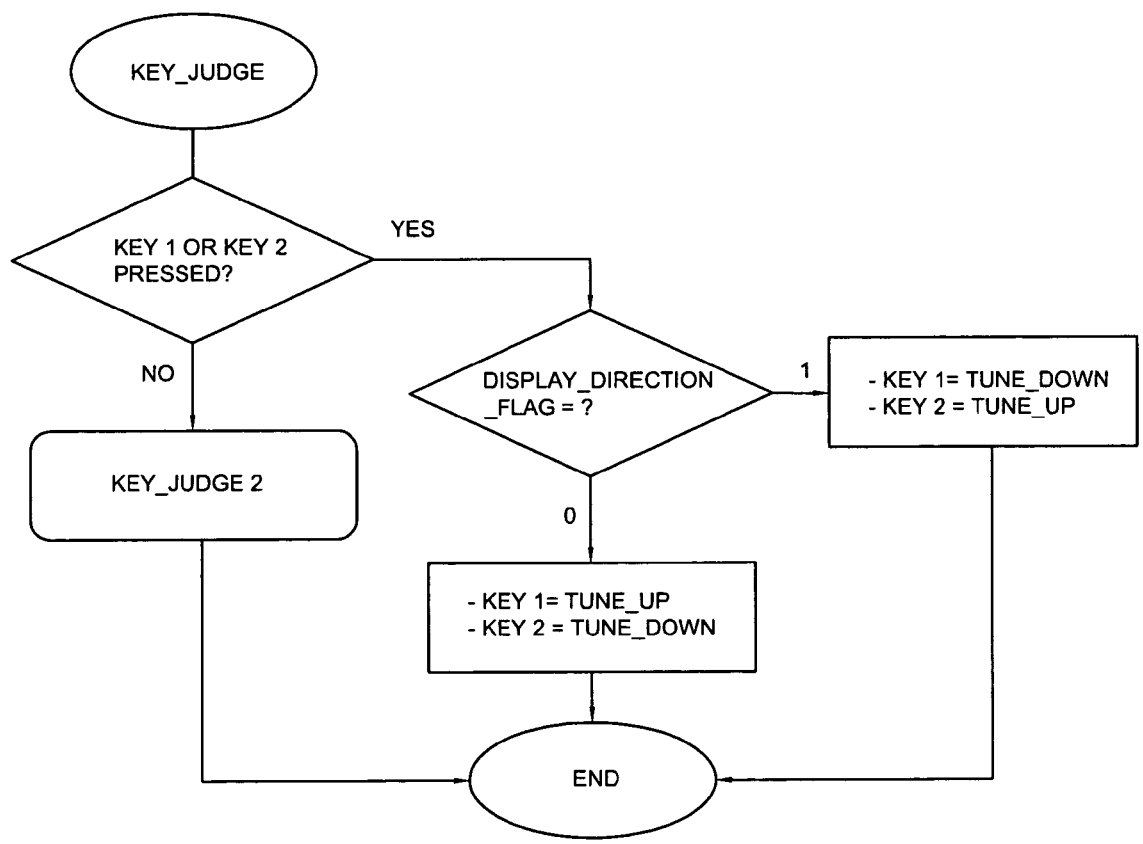

To overcome this problem met by the left-handed user, software control means, operated by control means such as a touch screen switch, is incorporated to initiate correction of both the display and arrow button functions when the CD player is held in the left hand. The software results in inversion of the display and also exchanges the functions of the arrow buttons (7, 8). Thus, as can be seen from FIG. 8, when a device according to the invention is held in the left hand and the device is in the left-hand mode, the LCD is now easy to read as the letters have been inverted. The display information on the LCD has been re-positioned to be the correct way up, and align with the general direction of viewing of the left handed operator. Also, the functions of the two arrow buttons have been exchanged so that arrow button (7) now decreases the frequency and arrow button (8) now increases the frequency, the arrows pointing in the conventional direction.

The arrow buttons (7, 8) may be physical switch buttons as shown in the drawings, or they may be virtual buttons generated on a touch screen display.

The drawings and flow charts for converting from left-hand mode to right-hand mode are illustrated in FIGS. 9 to 12 and are self explanatory. Implementation of the control feature is preferably done through firmware within the electronics of the device in a manner that is straightforward to a person skilled in the art and so does not require further elaboration herein.

In operation, the user simply operates the control means to selectively transfer from the right-hand mode to the left-hand mode.

As most devices are designed with the right-handed person in mind, then the invention has obvious advantages to a left-handed or ambidextrous person. The information display can be more readily seen and the arrow function keys are pointing in the conventional direction.

The device of the invention is particularly suited to so-called sports-type devices of the kind intended for use during physical activity such as jogging. In these circumstances, a user on the move will normally only be able to give limited concentration when operating the controls. Therefore, an interface that is easy to read and operate becomes especially important.

The invention has been described with reference to a preferred example, and it will be appreciated by those skilled in the art that various modifications can be made to the example without departing from the spirit and scope of the invention as defined in the following claims.

The invention claimed is:

1. A portable electronic device comprising:
   a generally disc shaped disc player having generally centrally located hand strap spaced above an upper surface of the disc shaped player whereby,
   wherein in use, a user's hand passes under the hand strap and grips the periphery of the disc,
   an information display panel located on the hand strap;
   function keys being located on the hand strap and comprising two arrow keys pointing in opposite directions;
   left-hand mode means and right-hand mode means for facilitating viewing the display and operation of the function keys depending whether the device is held in a user's right hand or a user's left hand; and
   control means for transferring from one mode to the other mode,
   wherein when transferring from one mode to the other mode the display information is inverted and the two arrow function keys exchange functions.

* * * * *

UNITED STATES PATENT AND TRADEMARK OFFICE
CERTIFICATE OF CORRECTION

PATENT NO. : 7,412,269 B2  Page 1 of 1
APPLICATION NO. : 11/118545
DATED : August 12, 2008
INVENTOR(S) : Kap Soung Lee et al.

It is certified that error appears in the above-identified patent and that said Letters Patent is hereby corrected as shown below:

Title Page; Please insert;

--(30)  Foreign Application Priority Data

April 30, 2004    (Malaysia)    20041643.--

Signed and Sealed this

Twenty-eighth Day of October, 2008

JON W. DUDAS
*Director of the United States Patent and Trademark Office*